Nov. 16, 1937.   F. D. KEITHLY   2,099,068
FIREPLACE SCREEN
Filed Jan. 14, 1937
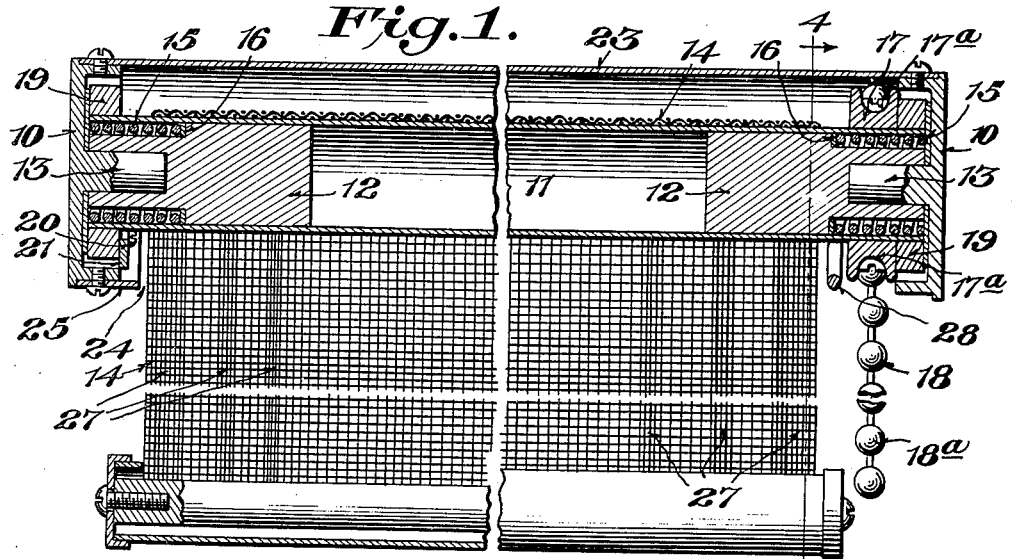
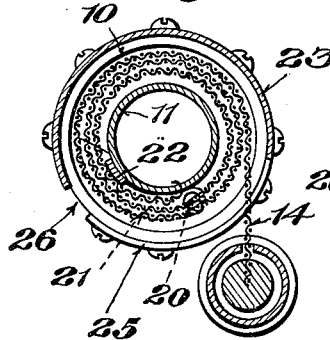
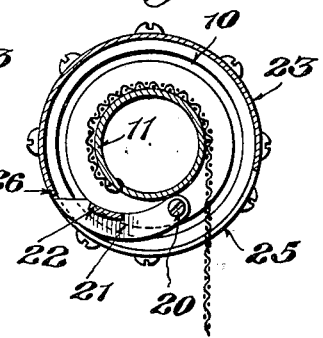
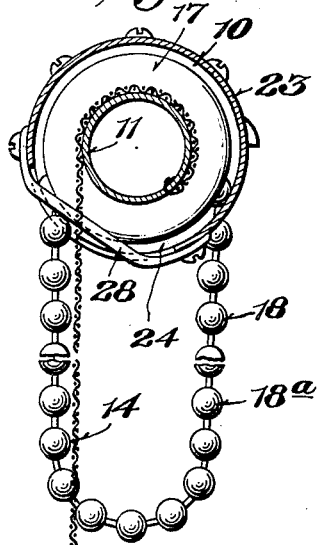
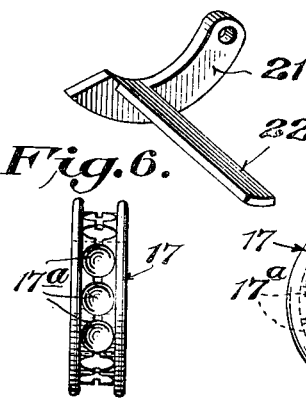
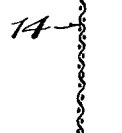
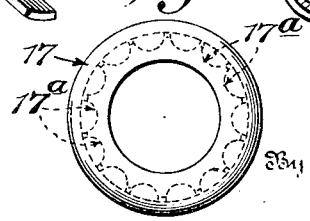
Inventor
FRED D. KEITHLY
D. P. Wolhaupter
Attorney Patented Nov. 16, 1937

2,099,068

UNITED STATES PATENT OFFICE 2,099,068

FIREPLACE SCREEN

Fred D. Keithly, Forest Hills, N. Y.

Application January 14, 1937, Serial No. 120,594

3 Claims. (Cl. 156—39)

This invention relates to screens of the roller type, and has particular reference to improvements in roller type fireplace screens of the general character illustrated, described and claimed in Koenig Patent No. 1,453,939 of May 1, 1923.

According to the construction illustrated and described in the aforesaid Koenig patent, it is possible, following unwinding of the screen from its roller, to rewind it upon its roller by rotating the roller in the same direction in which it rotated during unwinding of the screen therefrom. However, the screen is designed to be rewound upon its roller by rotating the roller in a direction opposite the direction in which it rotates during unwinding of the screen, and it is harmful to the screen to rewind it upon the roller in the manner first mentioned. Nevertheless, because of carelessness or ignorance on the part of many persons operating screens constructed in accordance with the Koenig patent, it frequently happens that a screen is rewound in the wrong direction upon its roller. Moreover, if the screen is of greater length than the height of the space between its roller and a hearth, as usually is the case, it frequently happens that more of the screen is unwound from the roller than is required to reach to the hearth, with the result that the screen becomes harmfully buckled and presents an unsightly appearance.

Accordingly, one important object of the present invention is to provide, in a roller type screen of the general character illustrated and described in the aforementioned Koenig patent, a simple, effective means requiring, on the one hand, that rewinding of the screen upon its roller be effected by rotating the roller in a direction opposite to the direction in which it rotates during unwinding of the screen therefrom, and serving, on the other hand, as a stop to prevent unwinding from the roller of more of the screen than is required to reach to the hearth, whereby the disadvantages mentioned are overcome.

Another object of the invention is to provide a screen having woven therein attractive reinforcements, at least one of which has special utility in connection with the means requiring opposite direction screen unwinding and rewinding rotation of the screen roller.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 1 is a vertical, longitudinal section through a screen of the roller type constructed in accordance with one practical embodiment of the present invention.

Figure 2 is a vertical, transverse section through the screen structure showing the screen wound upon its roller.

Figure 3 is a view similar to Fig. 2 showing the screen unwound from its roller.

Figure 4 is a section on the line 4—4 of Fig. 1.

Figure 5 is a perspective view of the pawl comprising part of the present invention.

Figure 6 is an edge view of the novel form of sprocket wheel employed as a part of the invention.

Figure 7 is a side elevation of the said sprocket wheel.

Referring to the drawing in detail, 10, 10 designate a pair of cap members to be mounted by means of brackets or in any other suitable manner on a fireplace above and to either side of the fireplace opening to serve as supports for the ends of a roller 11 which, in practice, is disposed horizontally above the fireplace opening and parallel to the front of the fireplace.

While the roller 11 may be of any suitable construction and may be rotatably supported at its ends by the cap members 10, 10 in any suitable manner, it preferably is in the form of a hollow, metal cylinder having suitably fixed in each end thereof a plug 12 and preferably is rotatably supported by said cap members 10, 10 by means of inwardly directed pins 13 on said cap members disposed in bores in the outer ends of the plugs 12. Moreover, while any suitable means may be provided to frictionally resist rotation of the roller 11 or to assure in any other way that the screen 14 which is wound on said roller will remain in any desired partially unwound position as well as in its fully wound and unwound positions, a practical means for this purpose may consist of a pair of coil springs 15, one at each end of the roller, disposed around a reduced, outer end portion of the related plug 12 and acting expansively between the related cap member 10 and a shoulder 16 at the inner end of the said reduced portion of the related plug.

Fixed on the roller 11 at or near one end thereof is a sprocket wheel 17 which has engaged therewith an endless chain, 18, preferably of the ball and link type, for manual manipulation to rotate said roller to wind and unwind the screen 14 onto and off of the same.

At its other end the roller 11 has suitably fixed thereon a ring or other suitable support 19, and on said ring or support is pivoted, as indicated at 20, for rotation on an axis parallel to the axis of the roller 11, one end of a pawl 21 the other end of which is free. This pawl is disposed outwardly of the adjacent side edge of the screen 14 and, between its ends, is provided with a lateral tongue 22 which extends inwardly into overlapping relationship to the screen 14.

The pawl 21 is applied to the ring or support 19 when the screen 14 is either partially or completely unwound from the roller 11, depending upon the length of the screen and the height at which the roller 11 is disposed above the hearth of the fireplace. It follows, therefore, that when the screen subsequently is wound onto the roller 11 the tongue 22 is picked up by the first occurring winding or convolution of the screen and becomes confined between said convolution and the next innermost convolution or the roller 11, as the case may be, and remains so confined during all subsequent winding of the screen onto the roller. On the other hand, the tongue, and consequently the pawl, is not released until the screen is unwound to an extent to remove all convolutions thereof which are disposed outwardly of the tongue 22.

Carried by the cap members 10, 10 is a shield or housing 23 which covers the roller 11 and which has a bottom opening, designated as 24, for passage of the screen 14 therethrough, said opening being either partly or entirely closed at the end of the shield related to the end of the roller having the pawl 21, by a segmental plate 25 fastened to the related cap member 10. Alternatively, the shield 23 may be of one-piece construction having a bottom portion corresponding to the plate 25. In any event, said plate or its equivalent underlies the pawl 21 and either has one edge thereof spaced from the adjacent edge of the shield 23 to provide an opening 26, or itself is provided with an opening, which is disposed in the path of movement of said pawl so as to be entered by the free end of the latter when the screen 14 is unwound from the roller 11 to an extent to release the pawl for outward swinging movement. The pawl is mounted so that its free end is its leading end and its pivoted end is its trailing end during screen unwinding rotation of the roller 11. Moreover, said pawl is mounted so that it becomes released and reaches a position where its free end will drop into the opening 26 and, by engagement with the stop comprised by the wall forming one edge of said opening will prevent further screen unwinding rotation of the roller 11, just slightly in advance of the bottom of the screen 14 reaching the hearth of the fireplace. Rewinding of the screen onto the roller 11 by continued rotation of the roller in the direction it rotated during unwinding of the screen thus is positively prevented and, at the same time, the possibility of more of the screen being unwound than is required to reach substantially to the hearth also is positively prevented.

Of course, instead of depending upon gravity to swing the pawl 21 outwardly when it is released, any suitable spring means may be provided for that purpose, and in that event it is, of course, not necessary that the opening 26 be located below the roller 11. Of course, too, it will be understood that in applying the present screen structure to any given fireplace, the pawl 21 will be mounted so that it is released and stops further downward movement of the screen immediately prior to the bottom of the screen reaching the hearth of the fireplace. Naturally, therefore, depending upon the length of the screen and the height at which the roller 11 is disposed above the hearth, it may be necessary to mount the pawl so that it is picked up between the roller and the first convolution of the screen, or between any given two convolutions of the screen.

An additional feature of the invention of practical advantage resides in weaving into the screen 14, longitudinally thereof, reinforcing strands of wire as indicated at 27. These strands, provided in any number desired and woven into the screen 14 wherever desired, not only reinforce the screen but serve when woven into the screen in certain predetermined ways greatly to improve its appearance. Moreover, when woven into that portion of the screen which cooperates with the tongue 22 of the pawl 21, the said reinforcing strands 27 serve to insure against injury of the screen by said pawl.

The shield 23 is illustrated in the present instance as being in the form of an open-bottom split tube, for convenience in manufacture and assembly with the other parts of the screen structure and to permit the screen 14 and the chain 18 to pass therethrough. Such being the case it is desirable to provide means adjacent to the sprocket wheel 17 to guard against the fingers of a person manipulating the chain 18 passing into the open bottom of the shield and possibly being injured. Accordingly, there is provided, inwardly of and adjacent to the sprocket wheel 17, a guard bar 28 which spans the space between the bottom edges of the shield 23 and is fastened at its ends in any suitable manner to said edges. This bar, besides serving as a finger guard, serves also to stiffen and reinforce the shield.

A practical and important feature, in the operation of the improved firescreen, is the special form of sprocket wheel employed with the ball type of endless operating chain 18. In prior structures, such for instance as that shown in the Koenig patent heretofore referred to, the endless flat link type of chain becomes easily twisted and knotted and interferes with the operation of the screen in the proper direction, particularly when handled by children or others not familiar with mechanical structures. This is obviated in the present invention by using a sprocket wheel 17 of an enclosed type, that is to say, the periphery of this wheel has formed therein semi-spherical recesses 17a constituting ball seats to snugly receive therein the balls 18a of the endless ball chain 18. With this construction the balls 18a become so interlocked with the seats in the periphery of the sprocket wheel that there is no danger of either the operating chain becoming knotted or kinked and besides, the interlocking engagement thereof with the sprocket wheel is of such a nature as to compel proper operation of the screen in either direction, even by unskilled persons.

Another practical feature of the invention is the selvage reinforcement 27 of the screen material, which reinforcement serves to stiffen the edge portions of the screen to such an extent as to assure and compel the certain operation of the locking pawl which serves to lock the screen in its lowered position.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a roller screen structure, a roller, a screen wound thereon, means including a pawl pivotally mounted on a fixed part of the roller to limit unwinding rotation of the roller, and a shield over the roller having a slot one end of which is disposed to constitute a fixed stop to be engaged by said pawl to limit unwinding rotation of the roller.

2. In a roller screen structure, a roller, a screen wound thereon, roller operating means depending from said roller, a shield over the roller having a bottom opening through which the screen and said operating means depend, and a guard bar spanning said shield bottom opening adjacent to said operating means.

3. In a roller screen structure, a roller, a screen wound thereon, a ring on said roller, means including a pawl pivotally mounted on said ring to limit screen unwinding rotation of said roller, and a shield over said roller having a slot one end of which is disposed to constitute a fixed stop to be engaged by said pawl to limit unwinding rotation of the roller.

FRED D. KEITHLY.